United States Patent [19]
Bass, III

[11] Patent Number: 5,167,185
[45] Date of Patent: Dec. 1, 1992

[54] COTTON MODULE BUILDER INCLUDING A HYDRAULICALLY MOTORIZED BRIDGE ASSEMBLY

[75] Inventor: B. Hampton Bass, III, Clarksdale, Miss.

[73] Assignee: The KBH Corporation, Clarksdale, Miss.

[21] Appl. No.: 813,550

[22] Filed: Dec. 26, 1991

Related U.S. Application Data

[63] Continuation-in-part of Ser. No. 637,354, Jan. 4, 1991, abandoned.

[51] Int. Cl.⁵ .......................... B30B 1/00; B30B 9/30
[52] U.S. Cl. .................................. 100/226; 100/100
[58] Field of Search ................................ 100/100, 226

[56] References Cited

U.S. PATENT DOCUMENTS

| | | | |
|---|---|---|---|
| 3,605,608 | 9/1971 | Dagley | 100/226 |
| 3,749,003 | 7/1973 | Wilkes et al. | 100/226 X |
| 3,855,917 | 12/1974 | Farrell et al. | 100/100 X |
| 3,866,530 | 2/1975 | Moehlenpah | 100/100 X |
| 3,896,720 | 7/1975 | Rhodes | 100/226 |
| 3,941,047 | 3/1976 | Orlando et al. | 100/226 X |
| 3,961,572 | 6/1976 | Johnston | 100/226 X |
| 4,184,425 | 1/1980 | Haney et al. | 100/226 X |
| 4,241,653 | 12/1980 | Fagundes et al. | 100/226 X |
| 4,344,272 | 8/1982 | Gaudette et al. | 100/226 X |

FOREIGN PATENT DOCUMENTS

| | | | |
|---|---|---|---|
| 2630718 | 11/1989 | France | 100/226 |
| 47-2822 | 1/1972 | Japan | 100/226 |
| 7703661 | 10/1978 | Netherlands | 100/226 |

OTHER PUBLICATIONS

The KBh Corporation, "Farmers who know, use KBH".

*Primary Examiner*—Harvey C. Hornsby
*Assistant Examiner*—Stephen F. Gerrity
*Attorney, Agent, or Firm*—Walker, McKenzie & Walker

[57] ABSTRACT

An improved cotton module builder which has a motorized bridge assembly. The cotton module builder includes a bin, a pair of tracks mounted adjacent the top of the bin and a tamper for tamping the cotton. A bridge supports the tamper. Wheels are provided for rollingly supporting the body of the bridge on the tracks. Hydraulic motors are supported by the bridge body and operably coupled to the wheels for moving the bridge along the tracks. A hydraulic source is provided which is remote from the bridge and is coupled to the hydraulic motors located on the bridge for actuating the hydraulic motors to move the bridge along the tracks. Stabilizing wheels are provided at opposite ends of the bridge for preventing racking of the bridge. The stabilizing wheels respectively engage the webs of a pair of I-beams, the upper surfaces of which form the tracks. In a modification of the cotton module builder each of the wheels is driven directly by a separate hydraulic motor. In another modification the stabilizing wheels are respectively urged against the webs by compression springs. In still another modification pulling assemblies respectively pull the wheels against the tracks to increase traction.

19 Claims, 6 Drawing Sheets

COTTON MODULE BUILDER INCLUDING A HYDRAULICALLY MOTORIZED BRIDGE ASSEMBLY

CROSS REFERENCE TO RELATED APPLICATION

This is a continuation-in-part of my pending application, Ser. No. 07/637,354, filed Jan. 4, 1991, entitled "COTTON MODULE BUILDER" (abandoned).

BACKGROUND OF THE INVENTION

1. Field of the Invention

The present invention relates, in general, to an improved cotton module builder, and particularly to a motorized bridge assembly of the cotton module builder.

2. Information Disclosure Statement

A preliminary patentability search conducted in Class 100, subclasses 100 and 226, produced the following patents which may relate to the present invention, copies of which were submitted with the parent application: Orlando et al, U.S. Pat. No. 3,941,047; Haney et al., U.S. Pat. No. 4,184,425; and Gaudette et al, U.S. Pat. No. 4,344,272.

Orlando et al discloses a cotton module builder including a mobile, open frame structure into which field cotton can be deposited. A tamper or compacting mechanism is mounted on an A-frame or bridge which moves longitudinally of the module builder along two rails or tracks. An endless chain is attached to the bridge at each end of the bridge structure and each chain is powered by a reversible motor for moving the bridge forward or backward along the rails.

Haney et al discloses a self-propelled cotton module builder generally similar to the above mentioned Orlando et al module builder and having the above listed components including the chains and the other mentioned components for moving the bridge forward or backward along the rails. There are drive wheels which are suspended from a walking beam through vertically movable members. Each of the vertically movable members carries an independent drive for the drive wheel connected thereto.

Gaudette et al discloses a cotton module builder also generally similar to the above mentioned Orlando et al module builder and having the above listed components of the Orlando et al module builder including the chains and the other components mentioned for moving the bridge forward or backward along the rails. In addition, Gaudette et al discloses a seed cotton extractor combined with the cotton module builder.

The conventional cotton module builder on the market today includes said above listed components of the Orlando et al module builder including the chains and the other components for moving the bridge forward or backward along the rails. With the use of such a system for driving the bridge along the rails the following major problems, among others, are encountered: (1) A tremendous amount of maintenance is required. (2) A tremendous amount of heat is generated in the hydraulic motor or motors driving the two endless chains since the endless chains are long, as for example in all module builders the chains are each 67.5 feet in length. In addition to the chains, in a typical system of this type the motors must drive a plurality of axles in eight different bearings and six sprockets. As is known by those skilled in the art, heat is a major enemy of hydraulic systems. (3) A great amount of power is required to move the bridge. (4) The operation of the system is jerky and the chains slap and flop, and it difficult to get the bridge to move evenly because the chains are continually tightening and loosening on each side of the module builder. (5) There are the hazards of persons getting sleeves and other articles of clothing caught in the chains or sprockets. This can be a life threatening situation if the person is pulled into mechanisms by virtue of the clothing being caught.

SUMMARY OF THE INVENTION

The present invention is directed towards providing an improved cotton module builder which overcomes previous problems relating to module builders.

One of the objects of the present invention is to provide in a cotton module builder an improved means for moving the tamper supporting bridge forward and rearward along tracks provided on the module builder.

A further object of the present invention is to provide an improved cotton module builder which requires less maintenance than conventional cotton module builders with endless chains for the drive of the bridges thereof.

A further object of the present invention is to provide such a module builder that is less hazardous to operate than previous module builders.

A further object of the present invention is to provide such a module builder in which the movement of the bridge is smoother than in previous module builders.

A further object of the present invention is to provide such a module builder which requires less power to move the bridge of the module builder.

A further object of the present invention is to provide such a module builder having increased traction during the leveling operation of the cotton.

DESCRIPTION OF THE PREFERRED EMBODIMENT

Figure 1:
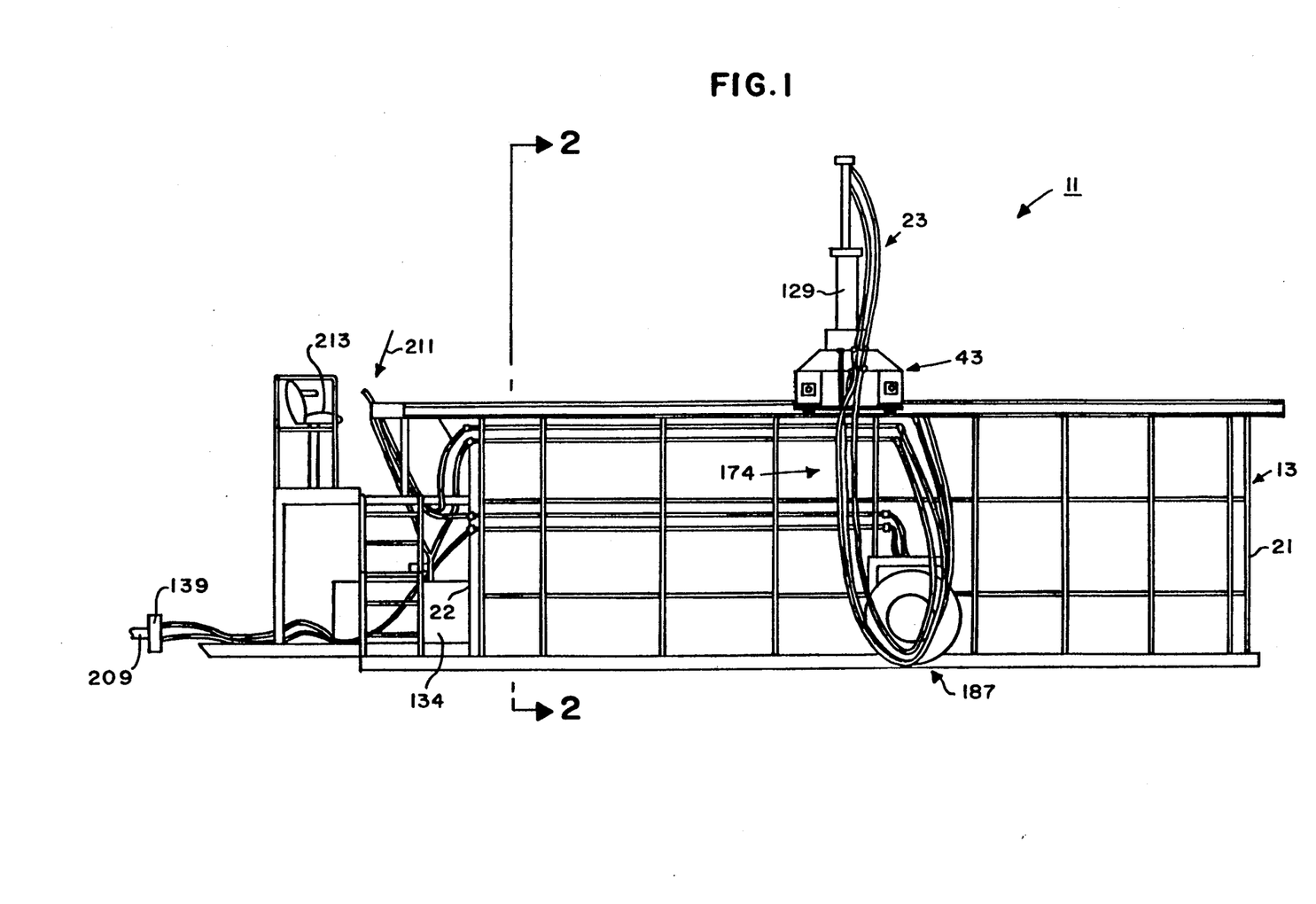
FIG. 1 is a side elevational view of the improved cotton module builder of the present invention.

In FIG. 1 is shown a module builder 11 embodying the present invention which comprises in general a rectangular open top bin 13, well known to those skilled in the art. Bin 13 includes side frames 15, 17, which respectively include side walls 19, 20. Also, module builder 11 includes end walls 21, 22 and a tamper 23 for tamping the cotton C which is dumped into the open top of the module builder in order to build the cotton module in a manner well known to those skilled in the art.

Figure 2:
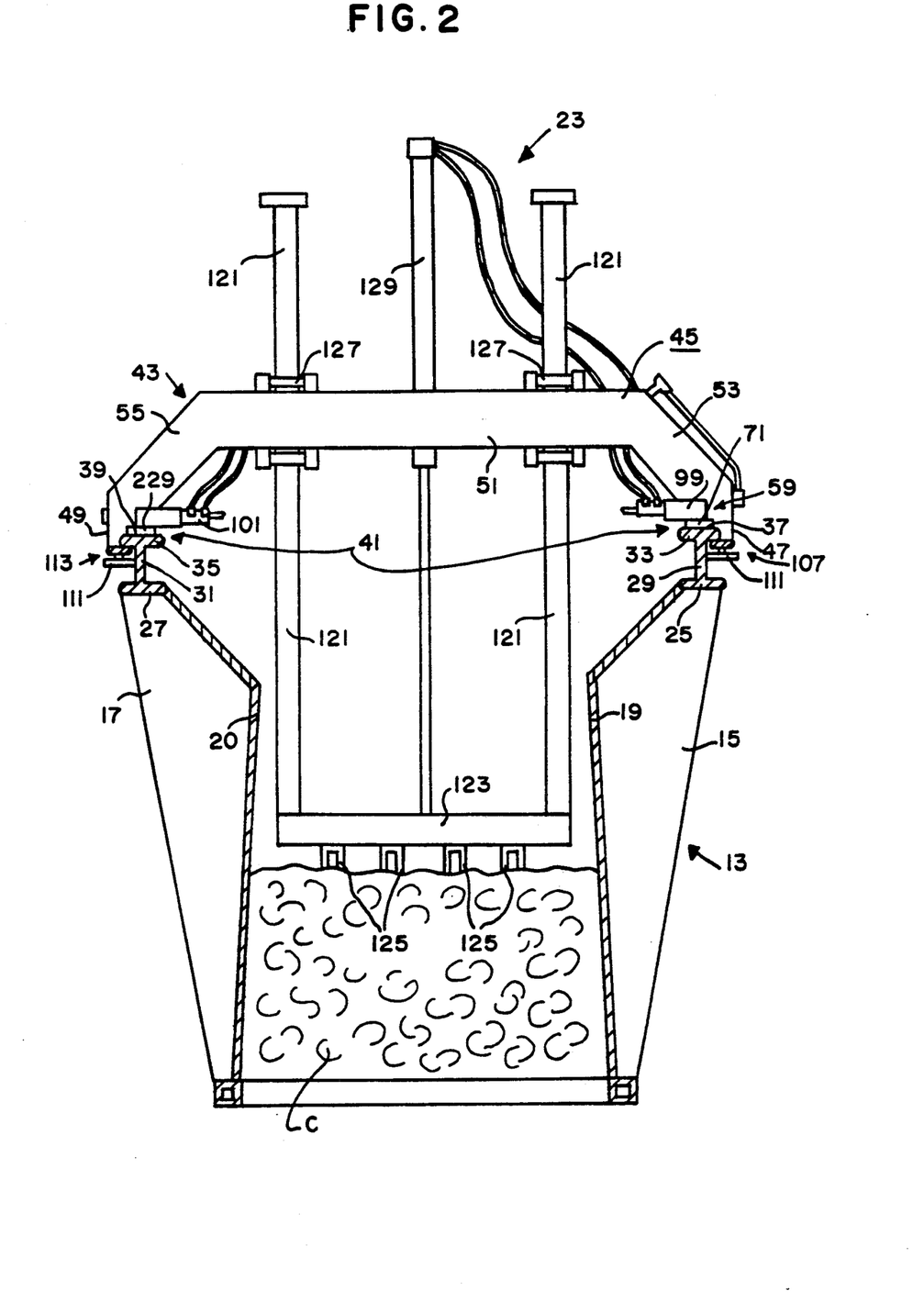
FIG. 2 is an enlarged sectional view taken on the line 2—2 of FIG. 1.

A pair of parallel and spaced I-beams 25, 27 are fixedly mounted on bin 13 adjacent the top of the bin and on opposite sides of the bin with I-beams 25, 27 extending longitudinally of module builder 11. I-beams 25, 27 respectively include webs 29, 31 and upper flanges 33, 35 respectively having top surfaces 37, 39. The top surfaces 37, 39 establish a pair of tracks 41.

A bridge 43 movably supports tamper 23 for movement of the tamper back and forth along the length of bin 13 to tamp the cotton therein from one end to the other. Bridge 43 includes in general a rigid A-frame or body 45 which extends transversely of bin 13 and has a first end 47 and a second end 49. Body 45 includes a central portion 51 and angular portions 53, 55 respectively depending from the opposite ends of central portion 51 at the respective first and second ends 47, 49 of body 45. Also bridge 43 includes in general rolling means 57 for rollingly supporting body 45 on tracks 41 and includes hydraulic motor means 59 supported by body 45 and operably coupled to rolling means 57 for moving bridge 43 along tracks 41.

Rolling means 57 is preferably divided into two sets of wheel means, namely a first wheel means set 61 at first end 47 of body 45 and a second wheel means set (not shown) at second end 49 of body 45 which are respectively driven by a first drive means 63 and a second drive means (not shown). Although the second wheel means set and the second drive means are not shown in their entirety, certain parts thereof are shown as will be apparent hereinafter. Also, it should be understood that the second wheel means set and the second drive means and its related structures are substantially like the first wheel means set 61 and the first drive means 63 and its related structures whereby the following description of first wheel means set 61, first drive means 63, and its related structures will suffice for both.

Figure 3:
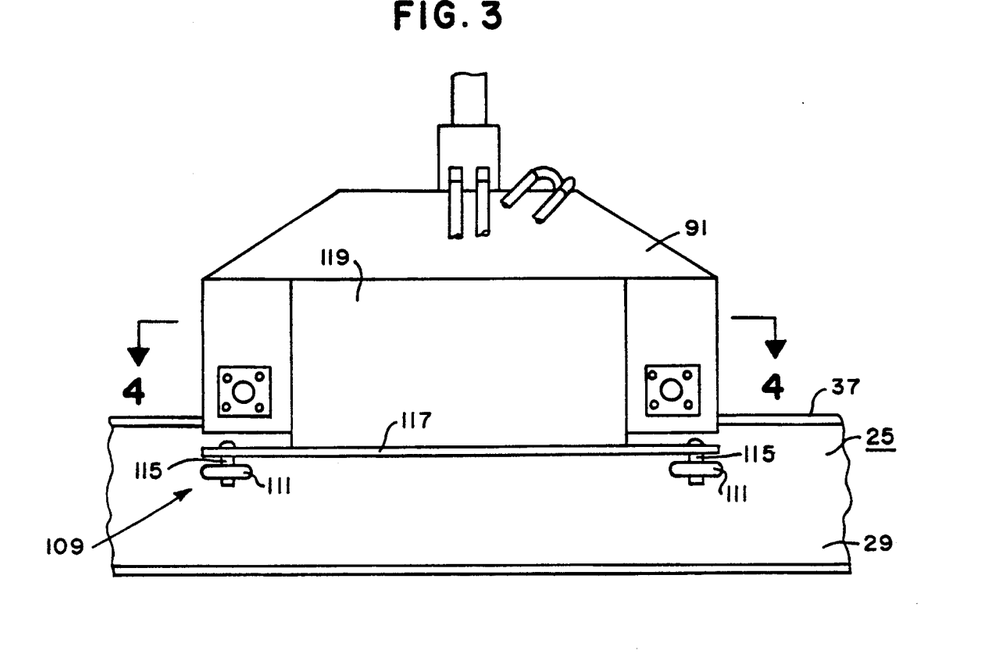
FIG. 3 is an enlarged fragmentary view of a portion of the cotton module builder shown in FIG. 1.
Figure 4:
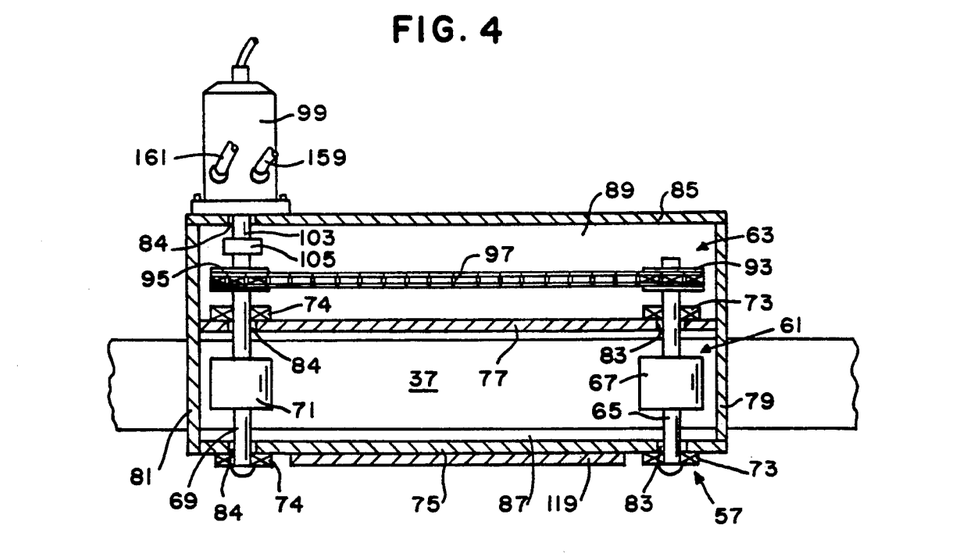
FIG. 4 is a sectional view taken as on line 4—4 of FIG. 3.
Figures 5, 6:
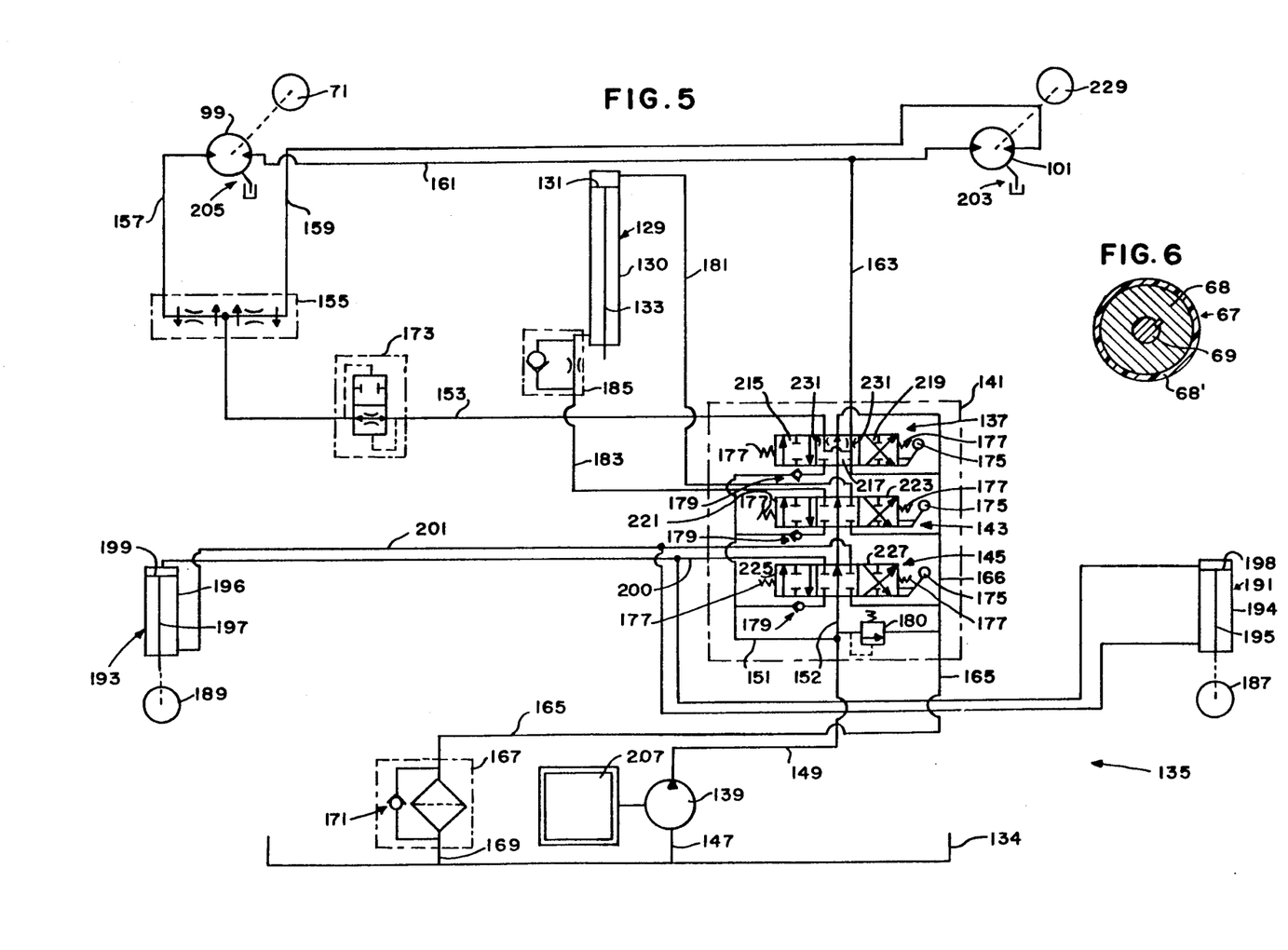
FIG. 5 is a schematic diagram of the hydraulic system employed in the improved cotton module builder.
FIG. 6 is an enlarged sectional view of one of the wheels of the improved cotton module builder.

First wheel means set 61 includes a first axle 65, a first wheel 67 fixedly mounted on first axle 65 by means well known to those skilled in the art, as for example, by having a splined shaft or axle, a second axle 69, and a second wheel 71 fixedly mounted on second axle 69 by means well known to those skilled in the art, as for example, by having a splined shaft or axle. Wheel 67 preferably includes a wheel base 68 having a coating of polyurethane 68' bonded to the wheel base around the periphery thereof in a manner well known to those skilled in the art. Wheel 71 of the same construction as wheel 67. In addition, first wheel means set 61 includes bearing means 73 supporting first axle 65 from body 45. More specifically, two bearing means 73 are preferably provided with one being supported from the outer wall 75 of portion 53 of body 45 and the other being supported by a cross member 77 of portion 53 which extends between end walls 79, 81 of portion 53, as best seen in FIG. 4. First axle 65 extends through apertures 83 respectively provided through outer wall 75 and cross member 77. Also, first wheel means set 61 includes bearing means 74 supporting second axle 69 from body 45. More specifically, two bearing means 74 are preferably provided with one being supported from the outer wall 75 of portion 53 of body 45 and the other being supported by cross member 77 of portion 53, as best seen in FIG. 4. Second axle 69 extends through apertures 84 respectively provided through outer wall 75 and cross member 77.

In addition portion 53 of body 45 includes an inner wall 85. Outer wall 75 and inner wall 85 ar respectively fixedly attached to the opposite ends of end walls 79, 81, and cross member 77 is fixedly attached at the opposite ends thereof respectively to end walls 79, 81 to establish a first compartment 87 of portion 53 which opens downwardly, and a second compartment which also preferably opens downwardly. Portion 53 is preferably provided with a top 91.

A first sprocket 93 is fixedly mounted, by means well known to those skilled in the art, on first axle 65 and a second sprocket 95 is fixedly mounted, by means well known to those skilled in the art, on second axle 69.

First wheel 67 and second wheel 71 are preferably located in first compartment 87 and engage the top surface 37 of upper flange 33 of I-beam 25 to rollingly support the first end 47 of body 45 from I-beam 25. It will be understood that the wheels of the second wheel means set which correspond to wheels 67, 71 engage the top surface 39 of I-beam 27 to rollingly support the second end 49 of body 45 from I-beam 27. First sprocket 93 and second sprocket 95 are preferably located in second compartment 89 and are operably connected by a continuous chain 97 which engages the respective first and second sprockets 93, 95 so that turning movement of second axle 69 is effective to drive first axle 65. If desired, a chain tightener, not shown, well known to those skilled in the art, may be utilized to tighten chain 97. First and second sprockets 93, 95 are of the same size, and first and second wheel 67, 71 are also of the same size so that the wheels are driven at the same rate on top surface 37.

Hydraulic motor means 59 preferably includes two reversible or bi-directional hydraulic motors 99, 101, well known to those skilled in the art. Hydraulic motor 99 is preferably fixedly mounted by suitable means well known to those skilled in the art on inner wall 85 with the shaft 103 thereof extending through an aperture 84 in inner wall 85 and into second compartment 89. A coupling means 105, well known to those skilled in the art, operably couples shaft 103 to axle 69 so that actuation of motor 99 is effective to rotate first and second wheels 67, 71.

Stabilizing wheel means 107 is rotatingly supported by bridge 43 and respectively engage webs 29, 31 of I-beams 25, 27 for preventing racking or skewing of bridge 43. More specifically, stabilizing wheel means 107 includes a first pair 109 of stabilizing wheels 111 at first end 47 of body 45 and a second pair 113 of stabilizing wheels 111 (only one of which is shown) at second end 49 of body 45. The second pair 113 of stabilizing wheels 111 and its related structure is preferably the same as first pair 109 of stabilizing wheels 111 and the following description for first pair 109 and its related structure will suffice for both.

Stabilizing wheels 111 of first pair 109 are rotatably attached to body 45 for free rotation about axles 115 which are respectively fixedly attached by suitable means well known to those skilled in the art to the opposite ends of a horizontal member 117, which is fixedly attached by suitable means well known to those skilled in the art to the lower edge of a plate 119, which in turn is fixedly attached by suitable means well known to those skilled in the art to the outside of outer wall 75 of portion 53. Stabilizing wheels 111 are preferably constructed in the same manner as that previously described for wheels 67, 71, that is with a coating of polyurethane bonded to the wheel base.

Tamper 23, which is conventional and is well known to those skilled in the art includes in general a pair of vertical members 121 and a horizontal member 123 fixedly attached to the lower ends of vertical members 121. A plurality of foot portions 125 which are fixedly attached to horizontal member 123 are adapted to engage the cotton C for the tamping thereof. Vertical members 121 are respectively mounted by bearings 127 from central portion 51 of body 45 for vertical movement. Tamper 23 also includes a piston/cylinder assembly 129 fixedly attached to body 45 by suitable means. Piston/cylinder assembly 129 includes a cylinder 130, a piston 131, and a piston rod 133 attached at its lower end to horizontal member 123 so that actuation of the piston/cylinder assembly 129 is effective to raise and lower members 121, 123 and foot portion 125.

In FIG. 5 is shown the preferable hydraulic source means of the cotton module builder 11 for actuating hydraulic motors 99, 101 to move bridge 43 along tracks 41 and which in general includes a reservoir 134 remote from bridge 43, conduit means 135 extending from reservoir 134 to bridge 43 for conducting hydraulic fluid to motors 99, 101, a directional control valve 137 interposed in conduit means 135 for controlling the flow of fluid through conduit means 135, and a pump 139 for pumping the hydraulic fluid from reservoir 134 under pressure to motors 99, 101.

Directional control valve 137 forms one part of a three spool directional control valve 141, well known to those skilled in the art, which in addition to directional control valve 137 includes a directional control valve 143 and a directional control valve 145.

Conduit means 135 includes a conduit 147 leading from hydraulic reservoir 134 to the intake of pump 139, a conduit 149 leading from the output of pump 139 to three spool directional control valve 141 where it is connected to a power core 151 and a center core 152 of control valve 141. In addition conduit 135 includes a conduit 153 extending between control valve 141 and a pressure compensated flow divider/combiner 155, a conduit 157 that extends between flow divider/combiner 155 and drive motor 99, a conduit 159 that extends between flow divider/combiner 155 to drive motor 101, a conduit 161 that extends between drive motor 99 and drive motor 101, a conduit 163 that extends between conduit 161 and control valve 141, a conduit 165 that extends between the fluid return core 166 of control valve 141 and a filter 167, and a conduit 169 that extends between filter 167 and reservoir 134. Filter 167 preferably includes a bypass valve 171. Also, a velocity fuse 173 is preferably interposed in conduit 153. A part of conduit means 135 is in the form of flexible hoses 174 which part includes the portions of conduits 153, 163, 181, and 183 which are adjacent bridge 43 whereby the movement of bridge 43 is not hampered by the hydraulic reservoir 134, pump 139, and control valve 141 being remote from bridge 43. Velocity fuse 173 and pressure compensated flow divider/combiner 155 are preferably mounted in the hollow central portion 51 of bridge 43.

Directional control valves 137, 143 and 145 are preferably respectively individually actuated manually by the respective handles 175 of the valves and with each of the valves being spring centered by springs 177. Also each of the control valves 137, 143, 145 have a check valve 179 in the portions of the power core 151 that leads to the respective valves. Additionally, control valve 141 includes a pressure relief valve 180 that extends between center core 152 and return core 166.

Control valve 143 controls the movement of tamper 23 and conduits 181, 183 respectively extend between control valve 143 and cylinder 130 to cause the up and down action of the tamper 23 in a manner well known to those skilled in the art. An orifice check valve 185 is preferably provided in conduit 183 to prevent an excessive rate of downward movement of the tamper 23.

Lift wheels 187, 189 are preferably provided on opposite sides of bin 13 for the raising of bin 13 for transporting and for lowering the bin to the ground for use. Lift wheels 187, 189 are lowered and raised respectively by piston/cylinder assemblies 191, 193 with the piston rods 195, 197 thereof being respectively operably coupled to lift wheels 187, 189 by suitable means well known to those skilled in the art. Piston/cylinder assemblies 191, 193 also respectively include cylinders 194, 196 and pistons 198, 199. A branched conduit 200 extends between control valve 145 and the head end of each of the lift cylinders 194, 196, and another branched conduit 201 extends between control valve 145 and the rod end of each of the lift cylinders 194, 196.

Each of the drive motors 99, 101 preferably respectively have case drains 203, 205, well known to those skilled in the art. Pump 139 is preferably driven by an engine 207, as from the power take off shaft 209 of a tractor, not shown, in a manner well known to those skilled in the art.

The directional control valve 141 is preferably mounted at the end of bin 13 in the area indicated by the arrow 211 so the operator can sit in the seat 213 provided and manually selectively operate the control valves 137, 143 or 145.

In the operation of the cotton module builder 11, and assuming the control valves 137, 143 and 145 are in the central or normal position symbolized in FIG. 5 with pump 139 being driven by engine 207, it will be understood that the hydraulic fluid being pumped to the control valve 141 will pass through the open center core 152 of control valve 141 and return to reservoir 134 through return core 166, conduit 165, filter 167 and conduit 169. Then if the operator desires to move bridge 43 in one direction, he moves handle 175 of control valve 137 in one direction, as for example to shift the left portion of the spool of valve 137, symbolized by the left envelope 215, to the right into the position that the center portion of the spool of valve 137, symbolized by the center envelope 217, occupied before the movement began. With the above mentioned shift of the valve 137, the fluid from pump 139 will be pumped through the power core 151, through control valve 137, through conduit 153 and velocity fuse 173 to pressure compensated flow divider/combiner 155. The flow divider/combiner 155 splits the flow evenly into the conduits 157 and 159. Thus, if the flow for example is 25 gallons per minute going into the flow divider/combiner 155 there will be 12½ gallons per minute flowing through each of the conduits 157, 159 to the respective drive motors 99, 101.

It will be understood that this flow of the hydraulic fluid from flow divider/combiner 155 will cause the shafts of the drive motors 99, 101 to turn in opposite directions, that is, drive motor 99 turns clockwise and drive motor 101 turns counterclockwise which will cause the wheels 71, 67 and the corresponding wheels of said second wheel means set to rotate in the same direction to move the bridge 43 in one direction along tracks 41. It will be seen in FIG. 5 that one of the wheels of said second wheel means set which corresponds to wheel 71 is shown schematically at 229. Also it will be understood that the above mentioned opposite rotation of the shafts of drive motors 99, 101 is provided since the shafts of motors 99, 101 extend in opposite directions. On the other hand, if it is desired to move bridge 43 in the opposite direction from said one direction towards the opposite end of the bin 13, the operator moves handle 175 of control valve 137 to shift the right portion of the spool of valve 137, symbolized by the right envelope 219, to the left as viewed in FIG. 5 and into the center position (i.e., the position previously occupied by center envelope 217 as shown in FIG. 5) so that the hydraulic fluid in power core 151 flows through control valve 137, through conduit 163 and to drive motors 99, 101 to cause the shafts of the drive motors to rotate in the opposite direction, that is, the shaft of drive motor 99 rotates counterclockwise and the shaft of drive motor 101 rotates clockwise to cause the wheels 71, 229 to rotate in a direction which is the opposite direction from that heretofore described when left envelope 215 was in said center position.

To prevent creeping of bridge 43 when control valve 137 is in the normal center position shown in FIG. 5, restrictions 231 are provided in the center portion of the spool of control valve 137.

To move the tamper 23 upwardly, the left envelope 221 of control valve 143 is shifted to the right to the center position to cause the hydraulic fluid in power core 151 to flow through control valve 143 to to rod end of piston/cylinder assembly 129 to lift the tamper 23 while at the same time the fluid in the head end of cylinder assembly 129 flows through conduit 181, control valve 143, through return core 166, conduit 165, filter 167, conduit 169, and into reservoir 134. On the other hand, to lower the tamper 23, the right envelope 223 of control valve 143 is shifted to the left to said center position to cause fluid to flow from power core 151 through control valve 143 and conduit 181 to the head end of piston/cylinder assembly 129 to cause the tamper 23 to lower.

To lower wheels 187, 189, and therefore raise bin 13, the left envelope 225 of control valve 145 is shifted to the center position so that hydraulic fluid flows from power core 151 through control valve 145 and through conduit 200 and the branches thereof to the head ends of the respective piston/cylinders 191, 193. When it is desired to raise lift wheels 187, 189 to lower bin 13, the right envelope 227 of control valve 145 is moved to said center position whereby the fluid from the power core 151 flows through control valve 145 and through conduit 201 and the branches thereof to the rod end of piston/cylinder assemblies 191, 193 which raises the wheels 187, 189 and lowers bin 13.

Figure 7:
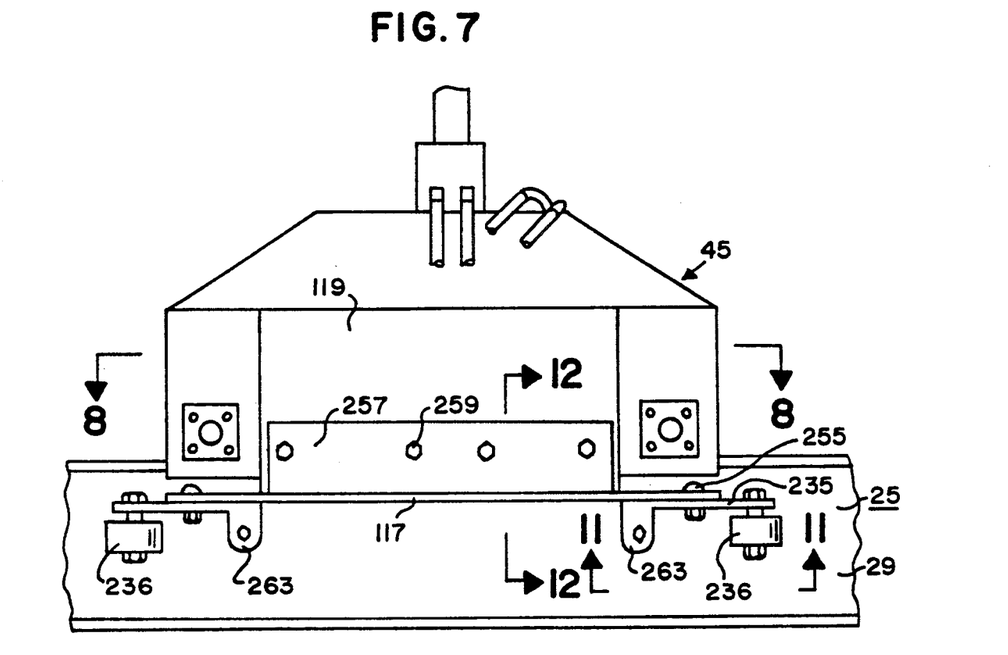
FIG. 7 is a view similar to FIG. 3 showing a modified form of certain portions of the present invention.

Referring now to FIGS. 7-12, wherein is shown an alternate or modified form of the present invention. These modifications relate in general to the following:

(1) Instead of first wheel 67 being driven by motor 99 through sprockets 93, 95 and continuous chain 97, the sprockets 93, 95 and chain 97 are omitted, and wheel 67 is driven directly by an additional hydraulic motor 233 (This modification is hereinafter referred to as modification #1).

(2) Instead of rotatably mounting stabilizing wheels 111 from horizontal member 117, the stabilizing wheel means include stabilizing wheel assemblies 2.111 which are respectively provided at the opposite ends of horizontal member 117. Each of the assemblies 2.111 include, among other things, a pivoted arm 235, a wheel 236, and urging means for urging the stabilizing wheel means against webs 29,31 for preventing racking of the bridge 43 (This modification is hereinafter referred to as modification #2).

(3) Pulling means is provided which is preferably in the form of a pair of assemblies 237 for pulling rolling means 57 against tracks 41 for increasing traction between the rolling means and the tracks (This modification is hereinafter referred to as modification #3).

Other than the modified portions shown and described herein relative to modifications #1, #2 and #3, the remainder of the alternate or modified form of the present invention is the same as that disclosed heretofore for the preferred embodiment.

Figure 8:
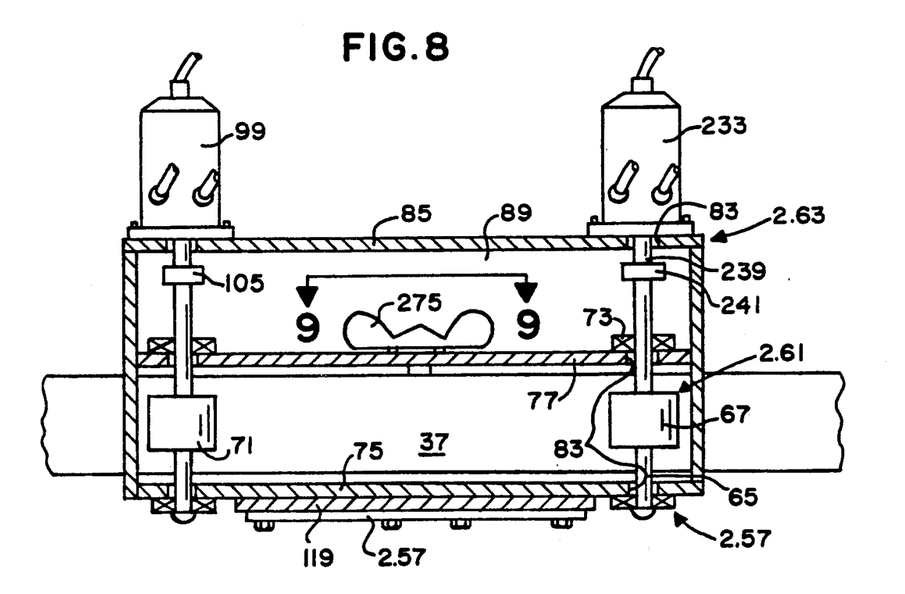
FIG. 8 is a sectional view taken as on the line 8—8 of FIG. 7 with portions removed for purposes of clarity.

Referring now more specifically to modification #1 mentioned above, motor 233 drives first wheel 67 in a similar manner to the drive of wheel 71 by motor 99. Thus, first axle 65 extends through apertures 83 respectively provided through outer wall 75 and cross member 77 as best seen in FIG. 8. In addition, hydraulic motor 233 is preferably fixedly mounted by suitable means well known to those skilled in the art on inner wall 85 with the shaft 239 thereof extending through an aperture 83 in inner wall 85 and into second compartment 89. Also, a coupling means 241, like coupling means 105 and well known to those skilled in the art, operably couples shaft 239 to axle 65 so that actuation of motor 233 is effective to rotate wheel 67. The remainder of modified rolling means 2.57 is like rolling means 57 of the first embodiment including being divided into two sets of wheel means, namely a first wheel means set 2.61 at first end 47 of body 45 and a second wheel means set (not shown) at second end 49 of body 45 which are respectively driven by first drive means 2.63 and second drive means (not shown). Although the second wheel means set and the second drive means are not shown in their entirety, certain parts thereof are shown as will be apparent. Also, it should be understood that the second wheel means set and the second drive means and its related structures are substantially like the first wheel means set 2.61 and the first drive means 2.63 and its related structures whereby the description of first wheel means set 2.61, first drive means 2.63, and its related structures will suffice for both.

Figure 15:
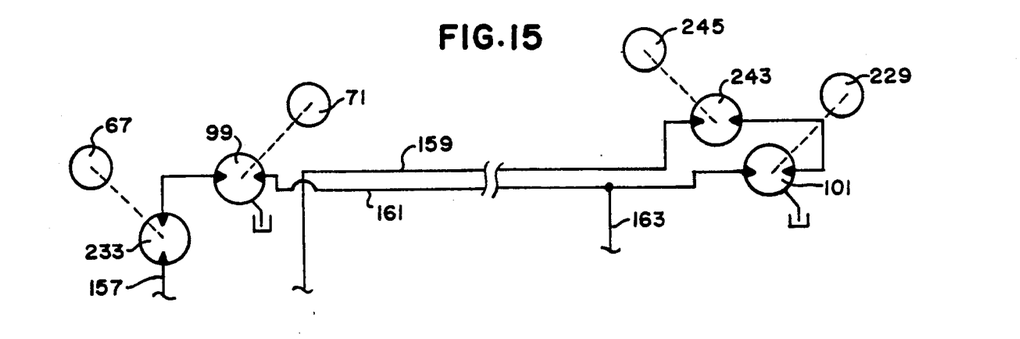
FIG. 15 is a view showing a portion of the schematic diagram of FIG. 5 with the modifications shown therein.

Referring now to FIG. 15 which shows the upper portion of FIG. 5 and which shows the incorporation of hydraulic motors 233 and 243 into the circuit and shows diagrammatically the driving of the respective wheels 67, 245. It will be understood that motor 243 and wheel 245 correspond respectively to motor 233 and wheel 67 but are on the opposite end of body 45, i.e., second end 49, from motor 233 and wheel 67. The remainder of FIG. 15, not shown, is the same as the remainder of FIG. 5. As will be seen in FIG. 15, the motor 233 is placed in series with motor 99 in conduit 157 and motor 243 is placed in series with motor 110 in conduit 159. Since the motors 99 and 233 and the motors 101 and 243 are respectively in series with one another and are all identical, since the flow of hydraulic fluid flowing through conduits 157, 159 is the same as previously explained, and since the wheels 67, 71, 229 and 245 have the same diameters, the wheels 67, 71, 229 and 245 are all driven at the same rotational speed and linear speed.

Figure 11:
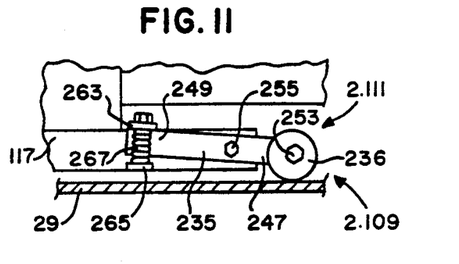
FIG. 11 is a fragmentary view taken as on the line 11—11 of FIG. 7.

Referring now more particularly to modification #2 and particularly to FIGS. 7 and 11, the stabilizing wheel means includes a first pair 2.109 of stabilizing wheel assemblies 2.111 at first end 47 of body 45 and a second pair of stabilizing wheel assemblies (not shown) at second end 49 of body 45. The second pair of stabilizing wheel assemblies and its related structures is preferably the same as first pair 2.109 of stabilizing wheel assemblies 2.111 and the following description for first pair 2.109 of stabilizing wheel assemblies 2.111 and its related structure will suffice for both.

Figure 12:
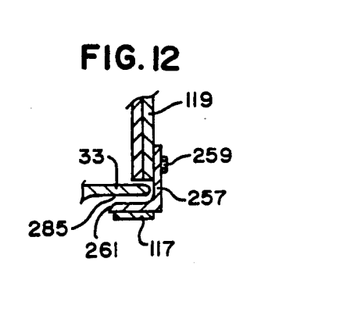
FIG. 12 is a sectional fragmentary view taken as on the line 12—12 of FIG. 7.

Stabilizing wheel assemblies 2.111 of first pair 2.109 are attached to body 45 adjacent first end 47 thereof. Each of stabilizing wheel assemblies 2.111 include arm 235 having a first end 247 and a second end 249, stabilizing wheel 236 rotatably mounted on first end 247 by suitable means well known to those skilled in the art such as the bolt means 253. Suitable means well known to those skilled in the art such as bolt means 255 pivotally mounts arm 235 at a point intermediate first and second ends 247, 249 thereof on body 45 for movement of stabilizing wheel 236 towards and away from web 29 of I-beam 25. More specifically, the portion of body 45 to which arm 235 is pivotally attached is preferably one end of horizontal member 117, which is fixedly attached to the lower edge of plate 119 by an angle member 257 that in turn is fixedly attached to plate 119 by means of bolts 259 or the like. The horizontal member 117 is fixedly attached to the lower flange 261 of angle member 257 by suitable means as welding or the like. The lower flange 261 of angle member 257 extends below upper flange 33 of I-beam 25 as shown in FIG. 12.

Stabilizing wheel assembly 2.111 also includes a first spring seat which is preferably in the form of a tab 263 or the like and which is fixedly attached to arm 235 adjacent second end 249 thereof and a second spring seat which also is preferably in the form of a tab 265 is fixedly attached to body member 45 and more specifically fixedly attached to horizontal member 117 of body member 45 as by welding or the like. Spring seats 263, 265 preferably extend downwardly in spaced apart relationship opposite one another. In addition, stabilizing wheel assembly 2.111 includes a compression spring 267 extending between first spring seat 263 and second spring seat 265 urging the second end 249 outwardly from web 29 and thus urging stabilizing wheel 236 inwardly against web 29, as best seen in FIG. 11 for preventing racking of bridge 43.

Figure 9:
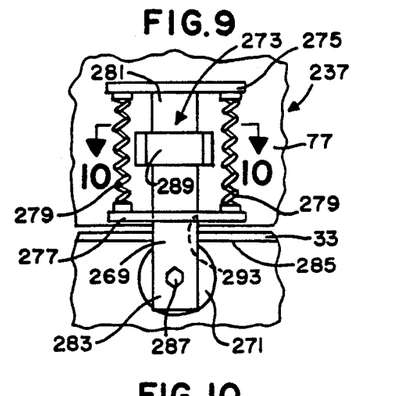
FIG. 9 is a fragmentary view taken as on the line 9—9 of FIG. 8.
Figure 10:
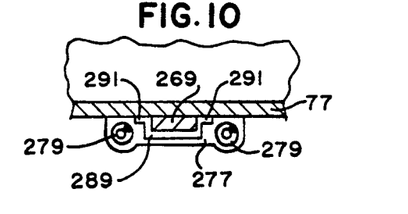
FIG. 10 is a fragmentary view taken as on the line 10—10 of FIG. 9.

Referring now to modification #3 and to FIGS. 8–10, pulling means is shown for pulling rolling means 2.57 against tracks 41 and for increasing traction between the rolling means and the tracks. The pulling means preferably include the pair of assemblies 237 respectively disposed on opposite ends of body 45 with one of assemblies 237 being adjacent one of I-beams 25, 27 and the other of the assemblies 237 being adjacent the other of the I-beams. Each of the assemblies 237 are preferably identical and the following description of the one adjacent I-beam 25 will suffice for both.

Each assembly 237 includes in general a hanger member 269, a roller 271, guide means 273, an upper spring base 275, a lower spring base 277 and tension springs 279.

More specifically, hanger member 269 is disposed vertically and has an upper end 281 and a lower end 283. Roller 271 is rotatably mounted on hanger member 269 adjacent the lower end 283 thereof with roller 271 rollingly engaging the undersurface 285 of the upper flange 33 of I-beam 25, as best seen in FIG. 9. The roller 271 is rotatably mounted on a horizontal axis by suitable means well known to those skilled in the art as by the axle 287. Roller 271 is preferably coated with polyurethane bonded to the roller base around the periphery thereof in a manner well known to those skilled in the art and in a manner similar to that shown in FIG. 6 for wheel 67 for smoothness of operation and reduction of noise that otherwise would occur with the metal of the roller against the metal of the I-beam.

Guide means 273 serve to guide vertical hanger member 269 in vertical upward and downward movement. Guide means 273 includes a bracket 289 through which the upper part of hanger member 269 slidably extends and which bracket 289 has outwardly extending flanges 291 that are fixedly attached to cross member 77 by suitable means well known to those skilled in the art, as welding or the like. The lower portion of guide means 273 includes an aperture 293 in lower spring base 277 which slidably receives hanger member 269.

Figure 13:
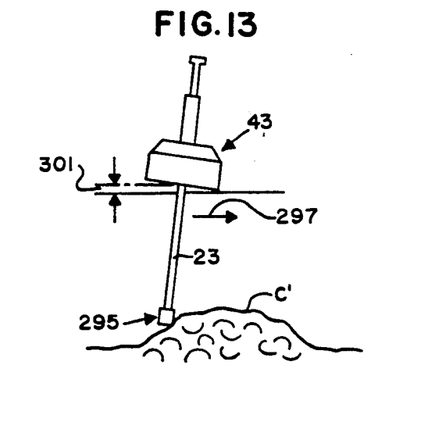
FIG. 13 is a diagrammatic view illustrating the effect on the bridge of the module builder of the present invention when the cotton is leveled in one direction.
Figure 14:
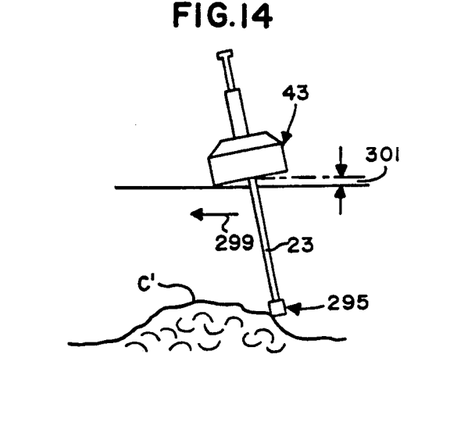
FIG. 14 is a diagrammatic view illustrating the effect on the bridge of the module builder of the present invention when the cotton is leveled in the opposite direction.

Referring now to FIGS. 13 and 14, the benefit of increased traction will be understood from the following description:

When the cotton C is loaded into the bin, the cotton will not be level across the top thereof but there will be humps C' of cotton and it is desirable to level out the humps. This can be done by the lower end 295 of tamper 23 during either a pushing motion in which the bridge 43 is moved in a direction away from end wall 22 and towards end wall 21, i.e., in a direction indicated by the arrow 297 in FIG. 13 or in the opposite direction in a pulling motion indicated by the arrow 299 as illustrated in FIG. 14.

It will be understood that during the pushing motion the bridge 43 will tend to tilt in one direction as shown in FIG. 13, i.e., clockwise, and during the pulling motion bridge 43 will tend to tilt in the opposite direction a shown in FIG. 14, i.e., counterclockwise due to the reactive force caused by the hump C' of cotton against the end 295 of the tamper 23. Also, it will be understood that this tilting motion has been exaggerated in FIGS. 13 and 14 for illustration purposes and that actually the maximum amount of lift from the tracks 41 at the center portion of bridge 43 is in the order of approximately ¼ inch, i.e., the dimension shown as at 301. The above mentioned center portion of bridge 43 is where the assemblies 237 are located, i.e., midway between the front and rearward ends of the bridge. Each assembly 237 keeps a constant pressure on the undersides of the upper flanges of I-beams 25, 27 tending to pull bridge 43 down on tracks 41.

When there is no load on the tamper 23, i.e., when not engaging the cotton for the tamping thereof, or during the leveling of the cotton as heretofore described, there will be a normal spacing between the lower flanges of the angle members and the undersurfaces of the upper flanges 33, 35 of the I-beams 25, 27 (as shown by the spacing in FIG. 12 between flange 261 and undersurface 285 of upper flange 33). This spacing will occur all along the length of the angle members but when the tamper 23 is exerting a downward force on the cotton C during tamping or when the cotton is being leveled, it will be understood that the distance 301 will vary anywhere from 0-¼ inches (for example). Also, it will be understood that assemblies 237 will exert a force in a direction towards pulling bridge 43 (i.e., wheels 67, 71, 243, 245) downwardly onto tracks 41. It will be understood that portions of bridge 43 which are below the upper flanges 33, 35 of I-beams 25, 27, which might contact the undersurfaces of the upper flanges (as for example flange 261 contacting undersurface 285) will cause a certain amount of traction during the leveling operation either during pulling or pushing, and it will be further understood that the assemblies 237 also produce even greater traction as heretofore explained.

Although the present invention has been described and illustrated with respect to a preferred embodiment and a preferred use thereof, it is not to be so limited since modifications and changes can be made therein which are within the full intended scope of the invention.

I claim:

1. A cotton module builder comprising:
 (a) a bin for containing cotton;
 (b) a pair of spaced tracks mounted on the bin adjacent the top thereof;
 (c) tamper means for tamping the cotton;
 (d) a bridge supporting said tamper means, said bridge comprising:
  (i) a body;
  (ii) rolling means including wheels for rollingly supporting said body on said tracks;
  (iii) hydraulic motor means supported by said body and coupled to said wheels for driving said wheels and thereby moving said bridge along said tracks; and
 (e) hydraulic source means fluidly coupled to said hydraulic motor means for actuating said hydraulic motor means to move said bridge along said tracks.

2. The cotton module builder of claim 1, in which is included pulling means for pulling said wheels against said tracks and for increasing traction between said wheels and said tracks.

3. The cotton module builder of claim 1, wherein said rolling means includes at least a pair of said wheels.

4. A cotton module builder comprising:
 (a) a bin for containing cotton;
 (b) a pair of spaced tracks mounted on the bin adjacent the top thereof, a pair of parallel I-beams respectively having flat top surfaces providing said tracks, said I-beams respectively including upper flanges respectively having under surfaces;
 (c) a tamper for tamping the cotton;
 (d) a bridge supporting said tamper, said bridge comprising:
  (i) a body;
  (ii) rolling means for rollingly supporting said body on said tracks;
  (iii) hydraulic motor means supported by said body and operably coupled to said rolling means for moving said bridge along said tracks;
 (e) hydraulic source means operably coupled to said hydraulic motor means for actuating said hydraulic motor means to move said bridge along said tracks;
 (f) pulling means for pulling said rolling means against said tracks and for increasing traction between said rolling means and said tracks, said pulling means including a pair of assemblies respectively disposed on opposite ends of said body with one of said pair of assemblies being adjacent one of said I-beams and the other of said pair of assemblies being adjacent the other of said I-beams, each of said assemblies including:
  (i) a hanger member having an upper end and a lower end;
  (ii) a roller rotatably mounted on said hanger member adjacent said lower end of said hanger member with said roller rollingly engaging said under surface of the I-beam adjacent thereto;
  (iii) guide means for guiding said hanger member in vertical upward and downward movement;
  (iv) an upper spring base fixedly attached to said hanger member adjacent said upper end thereof for upward and downward movement therewith;
  (v) a lower spring base fixedly attached to said body; and
  (vi) tension springs fixedly attached at the opposite ends thereof respectively to said upper spring base and said lower spring base for urging upwardly said upper spring base, said hanger member, and said roller to cause greater traction of said rolling means on said tracks.

5. A cotton module builder comprising:
 (a) a bin for containing cotton;
 (b) a pair of spaced tracks mounted on the bin adjacent the top thereof, a pair of parallel I-beams respectively having flat top surfaces providing said tracks, said I-beams respectively including webs;
 (c) a tamper for tamping the cotton;
 (d) a bridge supporting said tamper, said bridge comprising:
  (i) a body;
  (ii) rolling means for rollingly supporting said body on said tracks, said rolling means including at least two pairs of wheels, one of said pairs of wheels rollingly engaging the top surface of one of said pair of I-beams and the other of said pair of wheels rollingly engaging the top surface of the other of said pair of I-beams;
  (iii) hydraulic motor means supported by said body and operably coupled to said rolling means for moving said bridge along said tracks;
 (e) hydraulic source means operably coupled to said hydraulic motor means for actuating said hydraulic motor means to move said bridge along said tracks.

6. The cotton module builder of claim 5, wherein said hydraulic motor means includes a pair of hydraulic motors, one of said hydraulic motors being operably coupled to one of said wheels in one of said pair of wheels and the other of said hydraulic motors being operably coupled to one of said wheels in the other of said pair of wheels.

7. The cotton module builder of claim 6 including stabilizing wheel means rotatingly supported by said body and respectively engaging the webs of said I-beams for preventing racking of said bridge.

8. The cotton module builder of claim 7 in which said stabilizing wheel means respectively include urging means for urging said stabilizing wheel means against said webs.

9. The cotton module builder of claim 8 wherein said hydraulic source means includes a reservoir remote from said bridge, conduit means extending from said reservoir to said bridge for conducting hydraulic fluid to said hydraulic motors, valve means interposed in said conduit means for controlling the flow of fluid through said conduit means, and a pump for pumping the hydraulic fluid from said reservoir under pressure to said hydraulic motors.

10. The cotton module builder of claim 5, wherein said hydraulic motor means includes four hydraulic motors, two of said hydraulic motors being respectively operably coupled to said wheels in one of said pair of wheels and the other two of said hydraulic motors being respectively operably coupled to said wheels in the other of said pair of wheels.

11. The cotton module builder of claim 10 in which said hydraulic source means includes means for providing equal hydraulic flow to said pair of hydraulic motors for driving said hydraulic motors at the same speed.

12. The cotton module builder of claim 10 in which said hydraulic source means includes means for providing equal hydraulic flow to said four hydraulic motors for driving said four hydraulic motors at the same speed.

13. The cotton module builder of claim 5 including a pair of means respectively operably coupling together said wheels of each of said pair of wheels for causing said wheels of said pair of wheels to rotate at the same speed.

14. A cotton module builder comprising:
(a) a bin for containing cotton;
(b) a pair of parallel and spaced I-beams mounted on said bin adjacent the top of said bin and on opposite sides of said bin, said I-beams extending longitudinally of said module builder, each of said I-beams having a web and a top surface, said top surfaces of said I-beams establishing a pair of tracks;
(c) a tamper for tamping the cotton;
(d) a bridge supporting said tamper, said bridge comprising:
 (i) a body having a first end and a second end;
 (ii) a first wheel means set attached to said body adjacent said first end and a second wheel means set attached to said body adjacent said second end for rollingly supporting said body on said top surfaces of said I-beams;
 (iii) first and second drive means respectively supported by said body adjacent said first and second ends thereof, said first drive means being operably coupled to said first wheel means set and said second drive means being operably coupled to said second wheel means set for moving said bridge along said tracks; each of said wheel means set including a first axle, a first wheel fixedly mounted on said first axle, a second axle, and a second wheel fixedly mounted on said second axle; bearing means respectively rotatably supporting said first and second axles from said body, each of said drive means including a hydraulic motor means supported by said body, said hydraulic motor means having a motor shaft, a first sprocket fixedly mounted on said first axle, a second sprocket fixedly mounted on said second axle, and a continuous chain operably coupling said first and second sprockets together for the movement thereof at the same speed, and means coupling said motor shaft to said first axle for the drive of said first and second wheels; and
(e) hydraulic source means operably coupled to said hydraulic motor means for actuating said hydraulic motor means to move said bridge along said tracks; said hydraulic source means including a reservoir remote from said bridge, conduit means extending from said reservoir to said bridge of conducting hydraulic fluid to said hydraulic motor means, valve means interposed in said conduit means for controlling the flow of fluid through said conduit means, and a pump for pumping the hydraulic fluid from said reservoir under pressure to said hydraulic motor means.

15. The cotton module builder of claim 14 including stabilizing wheel means rotatingly supported by said bridge and respectively engaging the webs of said I-beams for preventing racking of said bridge.

16. The cotton module builder of claim 15 wherein said stabilizing wheel means includes a first pair of stabilizing wheels and a second pair of stabilizing wheels, first means for rotatingly attaching said first pair of stabilizing wheels to said body adjacent said first end and second means for rotatingly attaching said second stabilizing wheels to said body adjacent said second end, said first pair of stabilizing wheels engaging the web of one of said I-beams and said second pair of stabilizing wheels engaging the web of the other of said I-beams for preventing racking of said bridge.

17. A cotton module builder comprising:
(a) a bin for containing cotton;
(b) a pair of parallel and spaced I-beams mounted on said bin adjacent the top of said bin and on opposite sides of said bin, said I-beams extending longitudinally of said module builder, said I-beams respectively including webs and upper flanges respectively having under surfaces,
(c) a tamper for tamping the cotton:
(d) a bridge supporting said tamper, said bridge comprising:
 (i) a body having a first end and a second end;
 (ii) a first wheel means set attached to said body adjacent said first end and a second wheel means set attached to said body adjacent said second end for rollingly supporting said body on said top surfaces of said I-beams;
 (iii) pulling means for pulling said rolling means against said tracks and for increasing traction between said rolling means and said tracks, said pulling means including a pair of assemblies respectively disposed on opposite ends of said body with one of said pair of assemblies being adjacent one of said I-beams and the other of said pair of assemblies being adjacent the other of said I-beams; each of said assemblies including a hanger member having an upper end and a lower end; a roller rotatably mounted on said hanger member adjacent said lower end of said hanger member with said roller rollingly engaging said under surface of the I-beam adjacent thereto; guide means for guiding said hanger member in vertical upward and downward movement; an upper spring base fixedly attached to said hanger member adjacent said upper end thereof for upward and downward movement therewith; a lower spring base fixedly attached to said body; and tension spring means fixedly attached at the opposite ends thereof respectively to said upper spring base and said lower spring base for urging upwardly said upper spring base, said hanger member, and said roller to cause greater traction of said rolling means on said tracks;

(iv) first and second drive means respectively supported by said body adjacent said first and second ends thereof, said first drive means being operably coupled to said first wheel means set and said second drive means being operably coupled to said second wheel means set for moving said bridge along said tracks; each of said wheel means set including a first axle, a first wheel fixedly mounted on said first axle, a second axle, and a second wheel fixedly mounted on said second axle; bearing means respectively rotatably supporting said first and second axles from said body, each of said drive means including a pair of hydraulic motor means supported by said body, said hydraulic motor means respectively having motor shafts, and means for respectively coupling said motor shafts to said first axle and said second axle for the drive of said first and second wheels; and (e) hydraulic source means operably coupled to said hydraulic motor means for actuating said hydraulic motor means to move said bridge along said tracks; said hydraulic source means including a reservoir remote from said bridge, conduit means extending from said reservoir to said bridge for conducting hydraulic fluid to said hydraulic motor means, valve means interposed in said conduit means for controlling the flow of fluid through said conduit means, and a pump for pumping the hydraulic fluid from said reservoir under pressure to said hydraulic motor means.

18. The cotton module builder of claim 17 including stabilizing wheel means respectively engaging the webs of said I-beams for preventing racking of said bridge.

19. The cotton module builder of claim 18 wherein said stabilizing wheel means includes a first pair of stabilizing wheel assemblies attached to said body or bridge adjacent said first end thereof and a second pair of stabilizing wheel assemblies attached to s id body adjacent said second end thereof, each of said stabilizing wheel assemblies including:

(i) an arm having a first end and a second end;
(ii) a stabilizing wheel;
(iii) means for rotatably mounting said stabilizing wheel on said first end of said arm;
(iv) means for pivotably mounting said arm at a point intermediate said first and second ends thereof on said body for movement of said stabilizing wheel towards and away from one of said webs;
(v) a first spring seat attached to said arm adjacent said second end of said arm;
(vi) a second spring seat attached to said body in spaced relationship to and opposite said first spring seat; and
(vii) compression spring means extending between said first spring seat and said second spring seat for urging said stabilizing wheel into engagement with one of said webs for preventing racking of said bridge.

* * * * *

UNITED STATES PATENT AND TRADEMARK OFFICE
CERTIFICATE OF CORRECTION

PATENT NO. : 5,167,185
DATED : December 1, 1992
INVENTOR(S) : B. Hampton Bass, III It is certified that error appears in the above-indentified patent and that said Letters Patent is hereby corrected as shown below:

Title page:
 Page 1, References Cited, OTHER PUBLICATIONS, Column 2, line 3: "The KBh Corporation" should be --The KBH Corporation--.
 Column 4, line 17: "ar" should be --are--.
 Column 7, line 44: "to to" should be --to the--.
 Column 10, line 49: "a shown" should be --as shown--.
 Column 13, line 29 (Claim 13, line 4): "said wheels of said pair" should be --said wheels of each pair--.
 Column 14, line 8 (Claim 14, subparagraph (e), line 6): "bridge of conducting" should be --bridge for conducting--.
 Column 14, line 38 (Claim 17, line 9): "cotton:" should be --cotton;-- (i.e., the colon should be a semicolon).
 Column 16, line 11 (Claim 19, line 5): "s id" should be --said--.

Signed and Sealed this

Nineteenth Day of October, 1993

Attest:

BRUCE LEHMAN

Attesting Officer     Commissioner of Patents and Trademarks